United States Patent
Kim

(10) Patent No.: US 12,403,878 B2
(45) Date of Patent: Sep. 2, 2025

(54) METHOD AND APPARATUS FOR MINIMIZING POWER LOSS IN REDUNDANCY ELECTRIC BRAKE SYSTEM

(71) Applicant: HYUNDAI MOBIS CO., LTD., Seoul (KR)

(72) Inventor: Tae Hyeong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 486 days.

(21) Appl. No.: 17/987,263

(22) Filed: Nov. 15, 2022

(65) Prior Publication Data
US 2023/0331206 A1    Oct. 19, 2023

(30) Foreign Application Priority Data
Apr. 19, 2022  (KR) .................... 10-2022-0048300

(51) Int. Cl.
*B60T 13/74*    (2006.01)
*B62D 5/04*    (2006.01)

(52) U.S. Cl.
CPC ............ *B60T 13/741* (2013.01); *B62D 5/046* (2013.01); *B62D 5/0481* (2013.01)

(58) Field of Classification Search
CPC ..... B62D 5/046; B62D 5/0481; B60T 13/741; B60T 13/686; B60T 13/745; B60T 13/662; B60T 13/74; B60T 13/588; B60T 8/17; B60T 8/92; B60T 8/885; B60T 17/221; B60T 17/18; B60T 2270/402; B60T 2270/403; B60T 2270/406; H02K 11/33; H02K 11/21; H02K 11/27; H02K 2211/03

USPC ......................................................... 188/162
See application file for complete search history.

(56) References Cited

U.S. PATENT DOCUMENTS

| | | | | |
|---|---|---|---|---|
| 2009/0306841 A1* | 12/2009 | Miwa | ...................... | B60L 53/24 |
| | | | | 701/31.4 |
| 2013/0105254 A1* | 5/2013 | Isono | .................... | B60T 13/745 |
| | | | | 188/72.3 |
| 2017/0166248 A1* | 6/2017 | Asao | ........................ | H02P 29/00 |
| 2019/0299944 A1* | 10/2019 | Nilsson | .................. | B60T 7/042 |
| 2020/0039485 A1* | 2/2020 | Satoh | ....................... | B60T 8/17 |

(Continued)

*Primary Examiner* — Robert A. Siconolfi
*Assistant Examiner* — San M Aung
(74) *Attorney, Agent, or Firm* — Morgan, Lewis & Bockius LLP

(57) ABSTRACT

An apparatus for power loss minimization in a redundancy electric brake system includes: first and second power modules receiving power from a battery and supplying a three-phase alternating current to first and second windings of a motor, respectively; an input unit receiving data from an input information detector, wherein the data includes first and second power modules diagnostic information, MOSFET specifications, diode specifications, and a current command for generating a required braking force; a calculation unit calculating current threshold of minimum power losses using the data; a determination unit determining states of the first and second power modules using the first and second power modules diagnostic information; and a control unit configured to, upon determining that both states of the first and second power modules are normal, perform a mode for control of power loss minimization based on the current command and the current threshold of minimum power losses.

19 Claims, 7 Drawing Sheets

(56) References Cited

U.S. PATENT DOCUMENTS

2021/0188233 A1* 6/2021 Yuyama ................ H02K 11/33
2022/0055485 A1* 2/2022 Bergner ................ B60L 15/06

* cited by examiner

METHOD AND APPARATUS FOR MINIMIZING POWER LOSS IN REDUNDANCY ELECTRIC BRAKE SYSTEM

CROSS-REFERENCE TO RELATED APPLICATION

The present application is based on and claims the benefit of priority to Korean Patent Application Number 10-2022-0048300, filed on Apr. 19, 2022 in the Korean Intellectual Property Office, the entire disclosure of which is incorporated herein by reference.

TECHNICAL FIELD

The present disclosure relates to an apparatus and method for minimizing a power loss in a redundancy electric brake system.

BACKGROUND

The content described below merely provides background information related to the present embodiment and does not necessarily constitute prior art.

An electric brake system may supply hydraulic pressure required for braking to wheel cylinders by advancing a master cylinder using a rotational force of the motor, which is generated by operating a motor based on a pedal effort of a brake pedal.

In the meantime, a three-phase dual winding motor uses a three-phase rotating magnetic field formed by arranging three coils at intervals of 120 degrees from a central position and flowing a three-phase alternating current to each respective coil. Similarly, a six-phase motor with six-phase windings may be used, but a three-phase dual-winding motor using a three-phase alternating current of a dual-winding method in which one inverter controls one three-phase using a dual inverter system is generally used.

A three-phase dual winding motor may be controlled by two independent power modules without a dependent failure of each other. Here, a power module may include a metal-oxide-semiconductor field-effect transistor (MOSFET), a motor driving application specific integrated circuit (ASIC), a communication interface between a processor and the motor driving ASIC, a power supplied from a battery, and the like.

In the three-phase dual winding motor, a current may be controlled to be supplied to each winding when the dual winding system is all normal; however, when any one winding system fails, a current may be controlled to be supplied only to the other winding system which is in a normal state.

However, an existing electric brake system provided with a three-phase dual winding motor has a problem that when the double winding system is all normal, an unnecessary power loss is induced due to the constant operation of the two power modules, thereby reducing a distance for a corresponding vehicle to travel.

SUMMARY

According to an embodiment of the present disclosure, an apparatus for control of power loss minimization in a redundancy electric brake system that is provided with a motor to be supplied with power through two independent windings is provided, the apparatus comprising: a first power module configured to receive power from a battery and supply a three-phase alternating current to a first winding of the motor; a second power module configured to receive power from the battery and supply a three-phase alternating current to a second winding of the motor; an input unit configured to receive data from an input information detector, wherein the data comprises first power module diagnostic information, second power module diagnostic information, metal-oxide-semiconductor field-effect transistor (MOSFET) specifications, diode specifications, and a current command for generating a required braking force; a calculation unit configured to calculate a current threshold of minimum power losses using the data; a determination unit configured to determine a state of the first power module and a state of the second power module using the first power module diagnostic information and the second power module diagnostic information; and a control unit configured to, upon determining that both of the state of the first power module and the state of the second power module are normal, perform a mode for control of power loss minimization based on the current command and the current threshold of minimum power losses.

According to an embodiment of the present disclosure, a method for power loss minimization in a redundancy electric brake system including two independent power modules that receive power from a battery and each supply current to a motor through two independent windings is provided, the method comprising: receiving all or partial among a current command, first power module diagnostic information, and second power module diagnostic information data; calculating a current threshold of minimum power losses using the data; determining a state of a first power module and a state of a second power module using the first power module diagnostic information and the second power module diagnostic information; and performing a mode for control of power loss minimization based on the current command and the current threshold of minimum power loss upon determining that both of the state of the first power module and the state of the second power module are normal.

Figure 1:
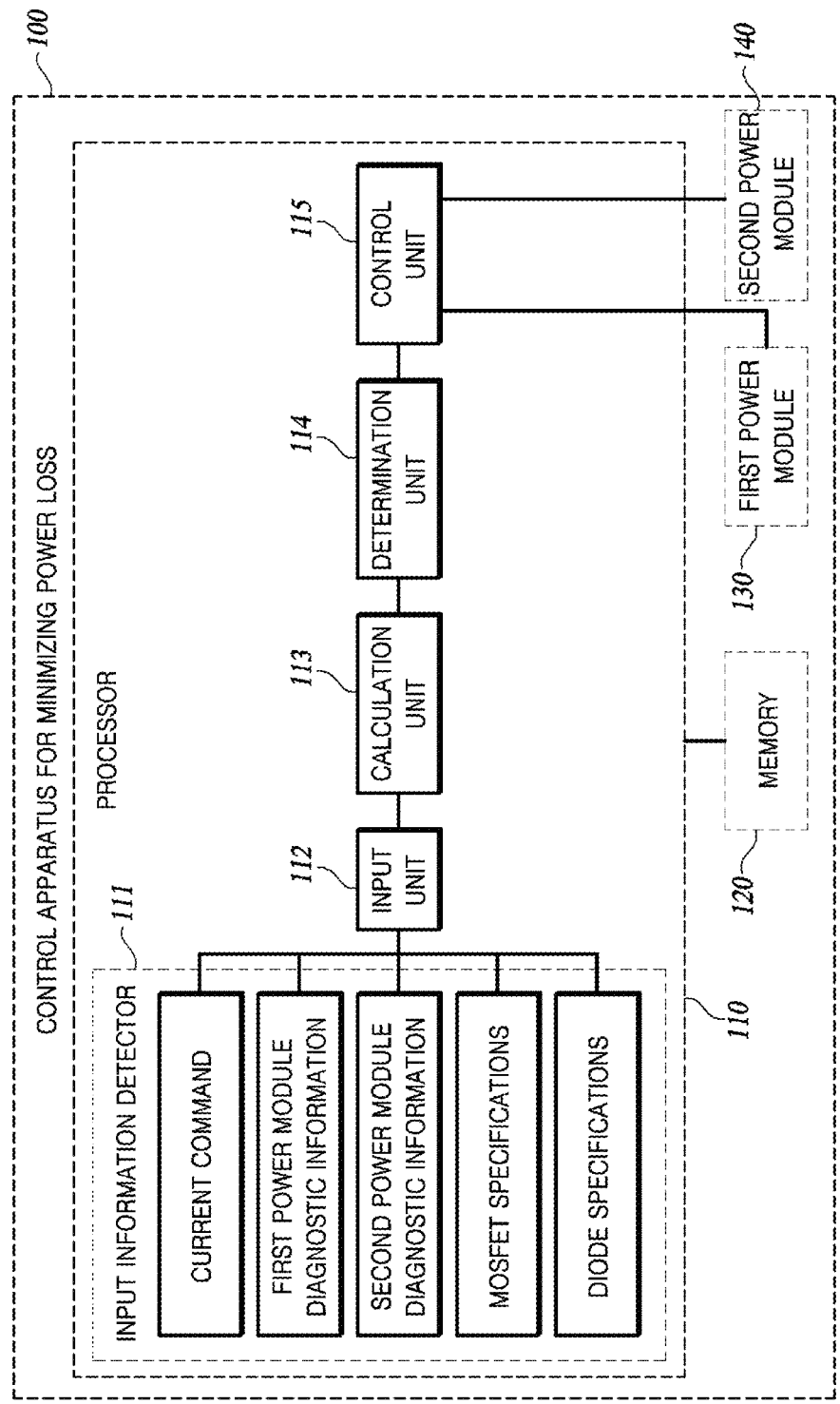
FIG. 1 is a diagram illustrating a configuration of a control apparatus for minimizing power loss in a redundancy electric brake system according to an embodiment of the present disclosure.

| REFERENCE NUMERICALS |
|---|
| 10: redundancy electric brake system |
| 20: battery |
| 100: control apparatus for minimizing a power loss |
| 110: processor |
| 111: input information detector |
| 112: input unit |
| 113: calculation unit |
| 114: determination unit |
| 115: control unit |
| 120: memory |
| 130: first power module |
| 131: first MOSFET |
| 140: second power module |
| 141: second MOSFET |
| 200: three-phase dual winding gear motor |
| 310: MOSFET conduction loss |
| 320: MOSFET switching loss |

DETAILED DESCRIPTION

The present disclosure provides an apparatus and control for minimizing a power loss in a redundancy electric brake system by reducing an unnecessary power loss occurring in two power modules.

The aspects of the present disclosure are not limited to the foregoing, and other aspects not mentioned herein will become more apparent to one of ordinary skill in the art to which the present disclosure pertains by referencing the detailed description given below.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

Each component of the apparatus or method according to the present disclosure may be implemented as hardware or software, or a combination of hardware and software. In addition, the function of each component may be implemented as software and a microprocessor may be implemented to execute the function of software corresponding to each component.

In the present specification, a vehicle may be any of various means of transportation, such as an autonomous vehicle, a robotaxi, a purpose-built vehicle (PBV), an urban air mobility (UAM) device, a personal mobility device, a mobile robot, and a two wheel drive device.

FIG. 1 is a diagram illustrating a configuration of a control apparatus for minimizing power loss in a redundancy electric brake system according to an embodiment of the present disclosure.

Referring to FIG. 1, a control apparatus 100 for minimizing a power loss may include all or at least one of a processor 110, a memory 120, a first power module 130, and a second power module 140.

Components of the control apparatus 100 may exchange signals or data with each other via an internal communication system of a vehicle. The vehicle's internal communication system may use at least one communication protocol (for example, Controller Area Network (CAN), Local Interconnect Network (LIN), Serial Peripheral Interface (SPI), FlexRay, Media Oriented Systems Transport (MOST), and Ethernet).

The processor 110 may include all or at least one of an input information detector 111, an input unit 112, a calculation unit 113, a determination unit 114, and a control unit 115.

The memory 120 may include all types of recording devices in which data readable by the processor 110 is stored.

The first power module 130 may supply a three-phase alternating current to a first winding by controlling switching of a metal-oxide-semiconductor field-effect transistor (MOSFET) included in the first power module 130 based on a current command. The first power module 130 may include a first motor driving application-specific integrated circuit (ASIC) (not shown) to control the switching of the MOSFET.

The second power module 140 may supply a three-phase alternating current to a second winding by controlling switching of a MOSFET included in the second power module 140 based on a current command. The second power module 140 may include a second motor driving ASIC (not shown) to control the switching of the MOSFET.

The input information detector 111 may include all or at least one of a current command, first power module diagnostic information, second power module diagnostic information, MOSFET specifications, and diode specifications.

The current command may be a signal transmitted from a vehicle control unit (not shown), which is a motor current to generate a required braking force based on a pedal effort of the brake pedal. The input information detector 111 may detect current command data from the vehicle control unit and transmit the detected current command to the input unit 112.

The first power module diagnostic information may include a failure diagnostic result for the first winding system including the first winding and the first power module.

The second power module diagnostic information may include a failure diagnostic result for the second winding system including the second winding and the second power module.

The MOSFET and diode specifications may be specification data for a MOSFET and a diode mounted in the control apparatus 100, and may be used to calculate current threshold of minimum power losses and stored in advance in the memory 120. The input information detector 111 may detect the MOSFET and diode specifications from the memory 120 and transmit the detected MOSFET and diode specifications to the input unit 112.

The input unit 112 may receive data from the input information detector 111.

The calculation unit 113 may calculate the current threshold of minimum power loss using data and equations.

The determination unit 114 may determine a state of the first power module and a state of the second power module using the first and second power module diagnostic information.

When it is determined that both of the state of the first power module and the state of the second power module are normal, the control unit 115 may perform a mode for control of power loss minimization based on the current command and the current threshold of minimum power loss.

Figure 2:
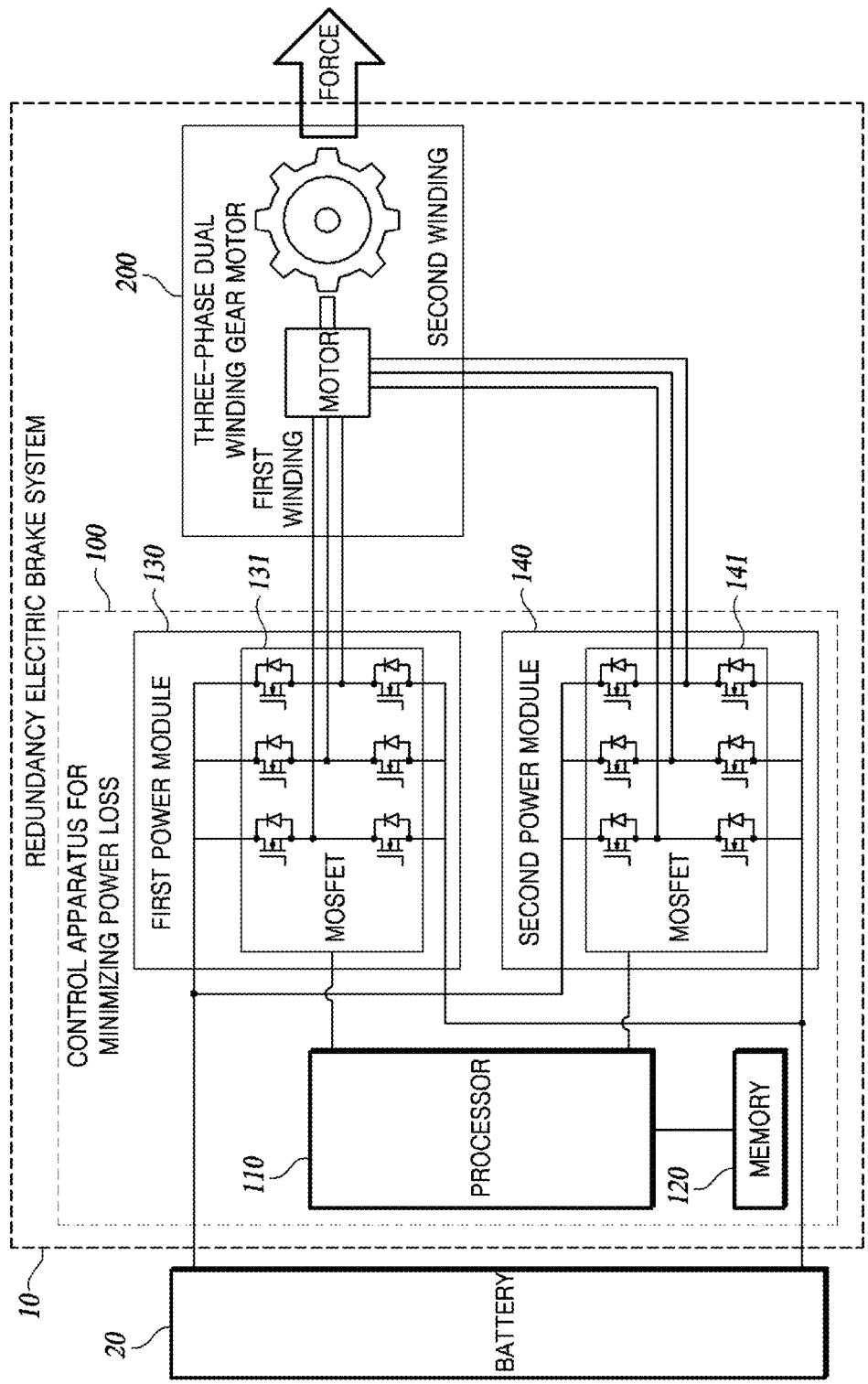
FIG. 2 is a diagram illustrating a configuration of a redundancy electric brake system according to an embodiment of the present disclosure.

FIG. 2 is a diagram illustrating a configuration of a redundancy electric brake system according to an embodiment of the present disclosure.

Referring to FIG. 2, an example of a configuration in which a redundancy electric brake system 10 includes a control apparatus 100 for minimizing a power loss and a three-phase dual winding gear motor 200 is shown.

A first power module 130 may include all or at least one of the following: a first MOSFET 131, a motor driving driver software of a processor 110, a first motor driving ASIC (not shown), a first communication interface (not shown) between the processor 110 and the first motor driving ASIC, and a first power (not shown) supplied from a battery.

The second power module 140 may include all or at least one of the following: a second MOSFET 141, a motor driving driver software of the processor 110, a second motor driving ASIC (not shown), and a second communication interface (not shown) between the processor and the second motor driving ASIC, and a second power (not shown) supplied from the battery.

The first MOSFET 131 and the second MOSFET 141 may be each composed of six MOSFETs, and each MOSFET includes free-wheeling diodes in parallel to allow a current to flow in reverse in a MOSFET switch-off state.

The three-phase dual winding gear motor 200 may include a motor, a gear, and all or at least one of first and second windings.

The three-phase dual winding gear motor 200 may convert a rotational force of the motor, which is generated based on a current command, into a force for advancing the master cylinder (not shown) through the gear. The force generated by the three-phase dual winding gear motor 200 may advance the master cylinder to form hydraulic pressure. An ESC (not shown) may operate a brake (not shown) of wheels (not shown) by controlling the hydraulic pressure.

Figure 3A:
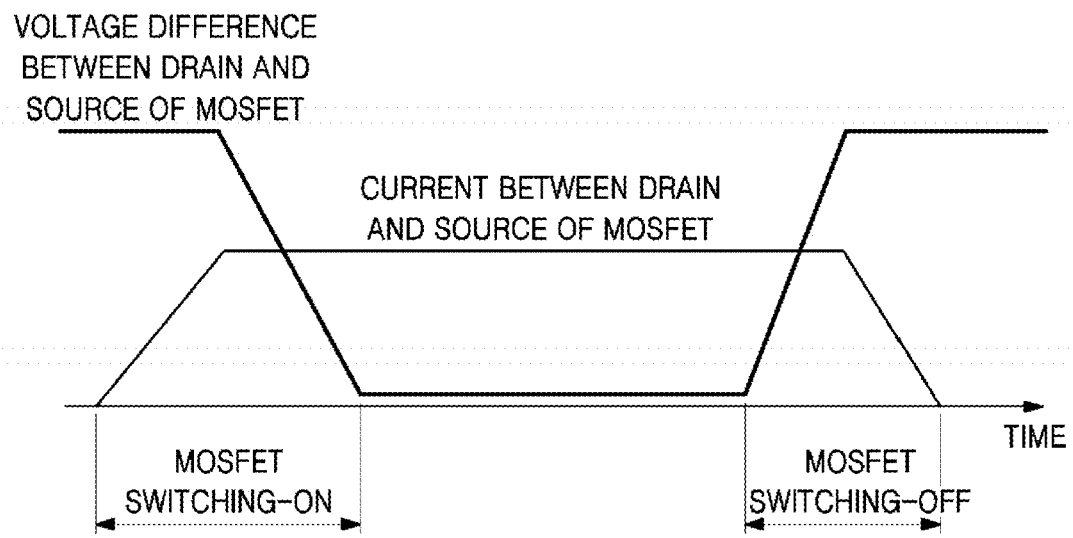
FIGS. 3A and 3B are diagrams exemplarily illustrating generation of metal-oxide-semiconductor field-effect transistor (MOSFET) conduction losses and MOSFET switching losses in a redundancy electric brake system according to an embodiment of the present disclosure.
Figure 3B:
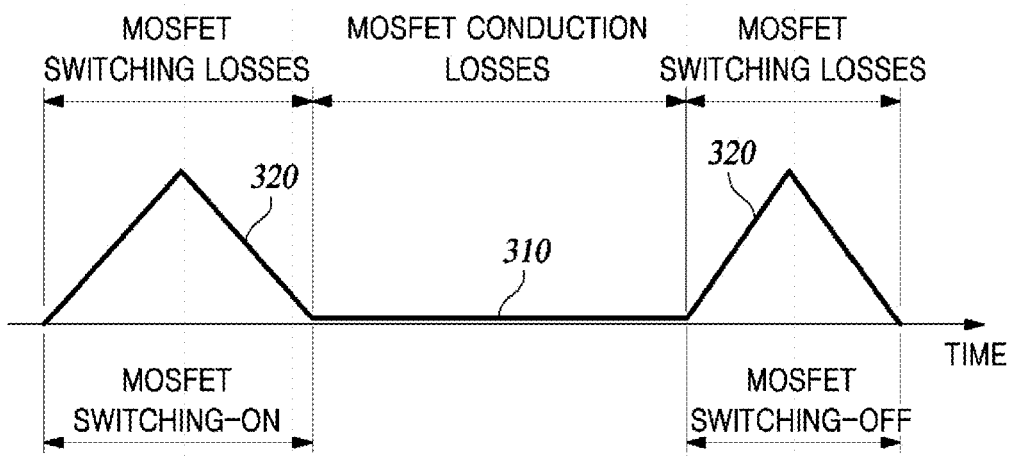

FIGS. 3A and 3B are diagrams exemplarily illustrating generation of metal-oxide-semiconductor field-effect transistor (MOSFET) conduction losses and MOSFET switching losses in a redundancy electric brake system according to an embodiment of the present disclosure.

Referring to FIG. 3A, during a MOSFET switching-on operation, a current between MOSFET drain and source terminals may increase, and then a voltage between the MOSFET drain and the source terminals may decrease. In a case where there is conduction between the drain and source terminals of the MOSFET, the MOSFET conduction resistance may be small even if a current flows between the drain and source terminals of the MOSFET, so there is no voltage difference between the drain and source terminals of the MOSFET. During a MOSFET switching-off operation, the voltage between the drain and source terminals of the MOSFET may increase, and then the current between the drain and source terminals of the MOSFET may decrease.

Referring to FIG. 3B, MOSFET switching losses 320 may be losses caused by change in the voltage between the drain and the source of the MOSFET and the current between the drain and the source of the MOSFET during the switching-on and off operation of the MOSFET, and does not occur unless a switching operation is performed. The MOSFET conduction losses 310 may be very small but unavoidable losses that occur in a state in which conduction is made between the drain and source terminals of the MOSFET.

A MOSFET power loss $P_{M-loss}$ may be calculated as the sum of MOSFET conduction losses $P_{M-cond-loss}$ generated while a current flows and MOSFET switching losses $P_{M-sw-loss}$ occurring during a MOSFET switching operation.

The MOSFET conduction losses $P_{M-cond-loss}$ may be calculated as the product of the square of a root mean square (RMS) $I_{rms}$ value of the MOSFET conduction current and a MOSFET conduction resistance $R_{M-on}$.

The switching losses $P_{M-sw-loss}$ of the MOSFET may be calculated as the product of a MOSFET switching energy loss $E_{M-on/off}$ and a switching frequency $f_{SW}$ occurring during the MOSFET switching operation. Therefore, the MOSFET power loss $P_{M-loss}$ may be expressed as in Equation 1.

Equation 1

$$P_{M-loss}=P_{M-cond-loss}+P_{M-sw-loss}=R_{M-on}\cdot I^2_{rms}+E_{M-on/off}f_{SW} \quad (1)$$

Like the MOSFET power loss $P_{M-loss}$, a diode power loss $P_{D-loss}$ may be calculated as the sum of diode conduction losses $P_{D-cond-loss}$ occurring while a current flows and diode switching losses $P_{D-sw-loss}$ occurring during the MOSFET's switching operation.

The diode conduction losses $P_{D-cond-loss}$ may be calculated as the product of the square of the RMS $I_{rms}$ value of the MOSFET conduction current and a diode conduction resistance ($R_{D-on}$).

The diode switching losses $P_{D-sw-loss}$ may be calculated as the product of diode energy losses $E_{D-on/off}$ and a switching frequency $f_{SW}$ occurring during the MOSFET switching operation. Therefore, the MOSFET power loss $P_{D-loss}$ may be expressed as Equation 2.

Equation 2

$$P_{D-loss}=P_{D-cond-loss}+P_{D-sw-loss}=R_{D-on}\cdot I^2_{rms}+E_{D-on/off}f_{SW} \quad (2)$$

Figure 4:
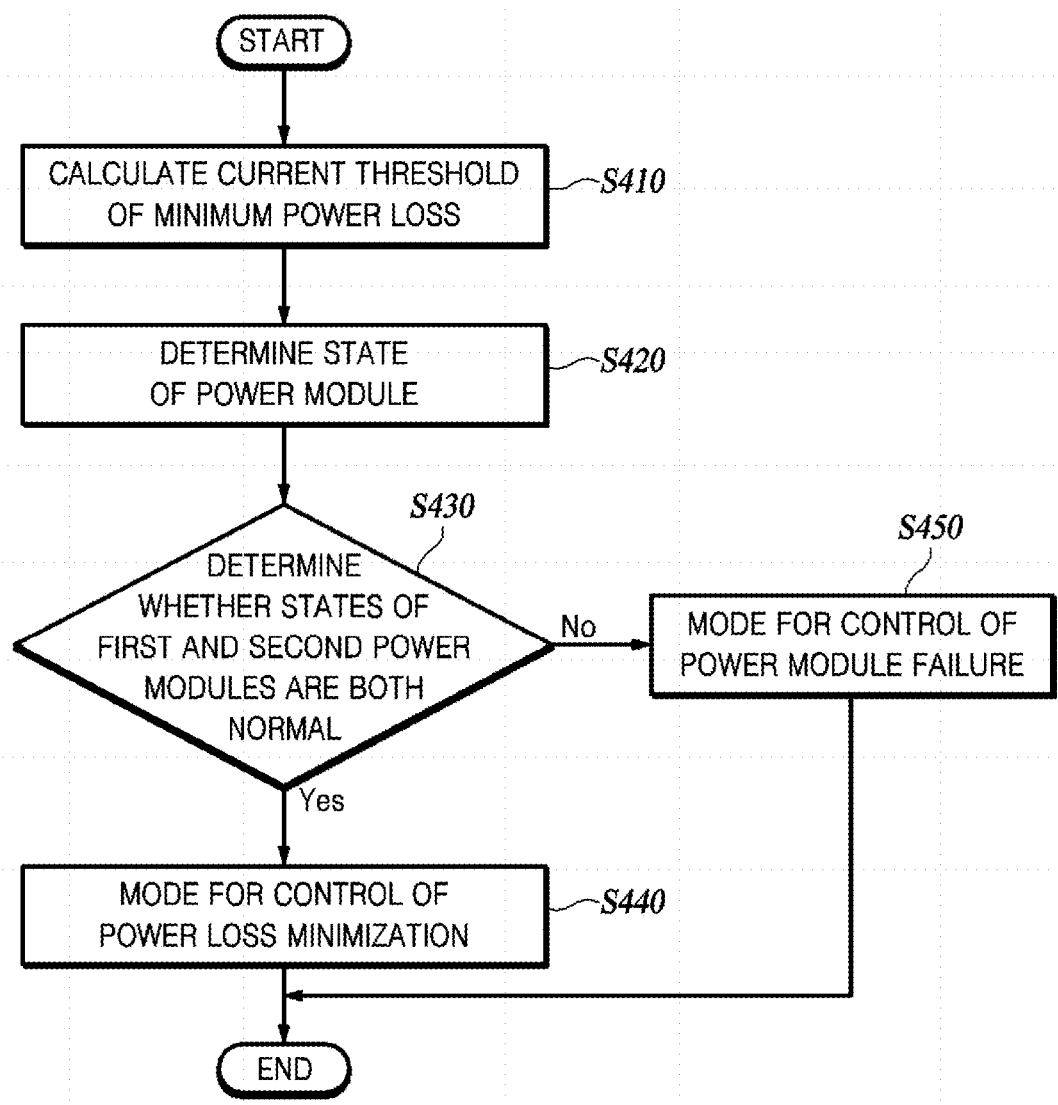
FIG. 4 is a flowchart illustrating a method for minimizing a power loss in a redundancy electric brake system according to an embodiment of the present disclosure.

FIG. 4 is a flowchart illustrating a method for minimizing a power loss in a redundancy electric brake system according to an embodiment of the present disclosure.

Referring to FIG. 4, a calculation unit 113 may calculate current threshold of minimum power losses using data such as a current command, and MOSFET and diode specifications in operation S410.

Based on Equations 1 and 2, it may be seen that conduction losses are proportional to a square of a current and that switching losses are proportional to a switching frequency. The conduction losses may be very small losses that occur only when a current flows, but the losses are unavoidable.

On the other hand, the switching losses may be losses that occur during a switching operation, and the switching losses do not occur if the switching operation is not performed.

When a current command from a vehicle control unit is small, a sum of the MOSFET switching losses $P_{M-sw-loss}$ and the diode switching losses $P_{D-sw-loss}$ during a MOSFET switching operation may be greater than a sum of the MOSFET conduction losses $P_{M-cond-loss}$ and the diode conduction losses $P_{D-cond-loss}$, and thus, this may be expressed as in Equation 3.

Equation 3

$$P_{M\text{-}cond\text{-}loss}+P_{D\text{-}cond\text{-}loss} < P_{M\text{-}sw\text{-}loss}+P_{D\text{-}sw\text{-}loss} \quad (3)$$

The calculation unit 113 may be able to calculate current threshold of minimum power losses, at which the sum of the MOSFET switching losses $P_{M\text{-}sw\text{-}loss}$ and the diode switching losses $P_{D\text{-}sw\text{-}loss}$ starts to be greater than the sum of the MOSFET conduction losses $P_{M\text{-}cond\text{-}loss}$ and the diode conduction losses $P_{D\text{-}cond\text{-}loss}$, and thus, this may be expressed as in Equation 4.

Equation 4

$$I_{min\text{-}loss} < \sqrt{\frac{\left(E_{M\text{-}\frac{on}{off}} + E_{D\text{-}\frac{on}{off}}\right)}{(R_{M\text{-}on} + R_{D\text{-}on})}} \cdot f_{sw} \quad (4)$$

The current threshold of minimum power loss may be used as a criterion for determining whether to perform a mode for control of power loss minimization in which only one of the first power module 130 and the second power module 140 is operated.

A determination unit 114 may determine first and second power module states using first and second power module diagnostic information in operation S420.

The determination unit 114 may determine whether the first and second power module states are both normal in operation S430.

When it is determined that both of the first and second power module states are normal in operation S430, the control unit 115 may perform a mode for control of power loss minimization in operation S440. Based on the current command and the current threshold of minimum power loss, the control unit 115 may determine a number of operations of the power module and a magnitude of a current command of each power module in order to minimize a power loss.

When it is determined that any one of the state of the first power module and the state of the second power module is faulty in the operation S430, the control unit 115 may perform a mode for control of power module failure in operation S450.

Figure 5:
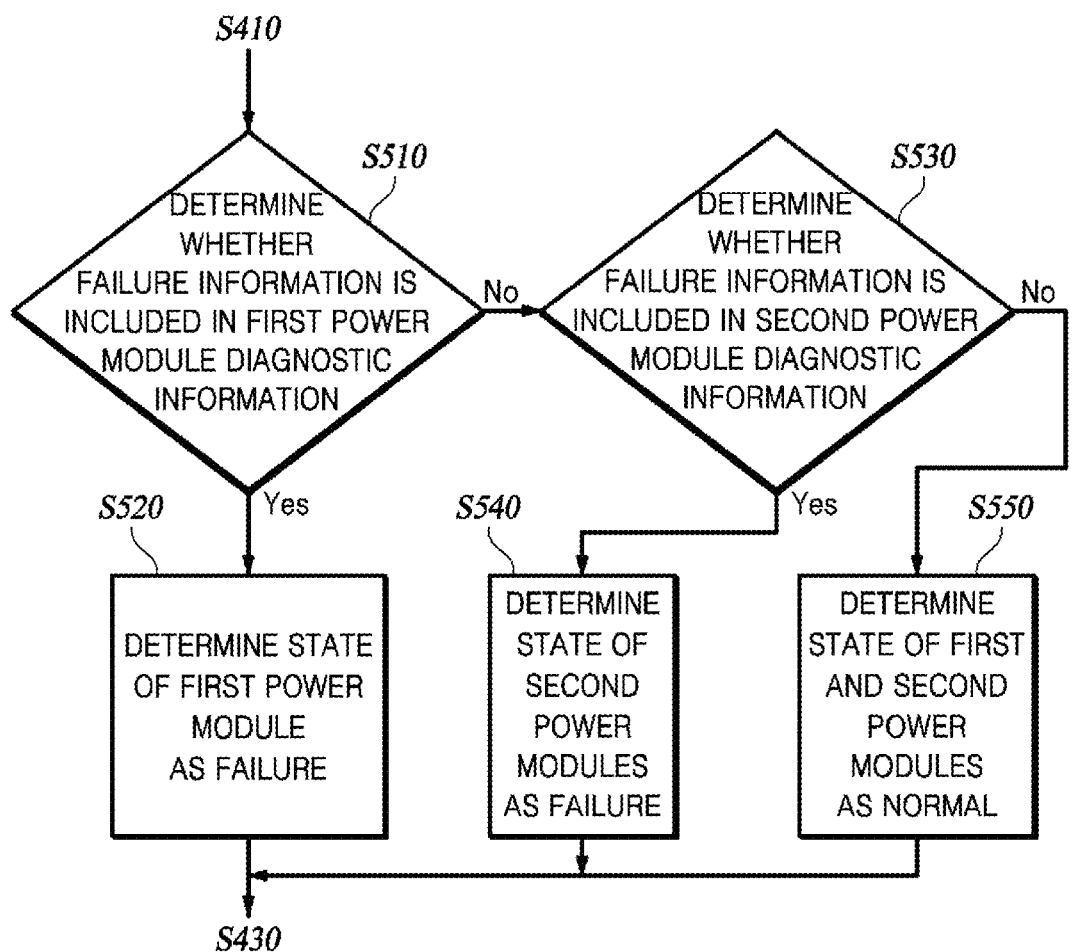
FIG. 5 is a flowchart illustrating in detail a process in which the control apparatus for minimizing a power loss in a redundancy electric brake system determines the states of first and second power modules according to an embodiment of the present disclosure.

FIG. 5 is a flowchart illustrating in detail a process in which the control apparatus for minimizing a power loss in a redundancy electric brake system determines the states of first and second power modules according to an embodiment of the present disclosure.

Referring to FIG. 5, a determination unit 114 may determine whether there is failure information in first power module diagnostic information in operation S510.

When it is determined that there is failure information in the first power module diagnostic information in operation S510, the determination unit 114 may determine a state of the first power module as failed in operation S520.

When it is determined that there is no failure information in the first power module diagnostic information in operation S510, the determination unit 114 may determine whether there is failure information in second power module diagnostic information in operation S530.

When it is determined that there is no failure information in the first power module diagnostic information in operation S510 and it is determined that there is failure information in the second power module diagnostic information in operation S530, the determination unit may determine a state of a second power module as failed in operation S540.

When it is determined that there is no failure information in the first power module diagnostic information in operation S510 and it is determined there is no failure information in the second power module diagnostic information in operation S530, the determination unit 114 may determine the state of the first power module and the state of the second power module as normal in operation S550.

Figure 6:
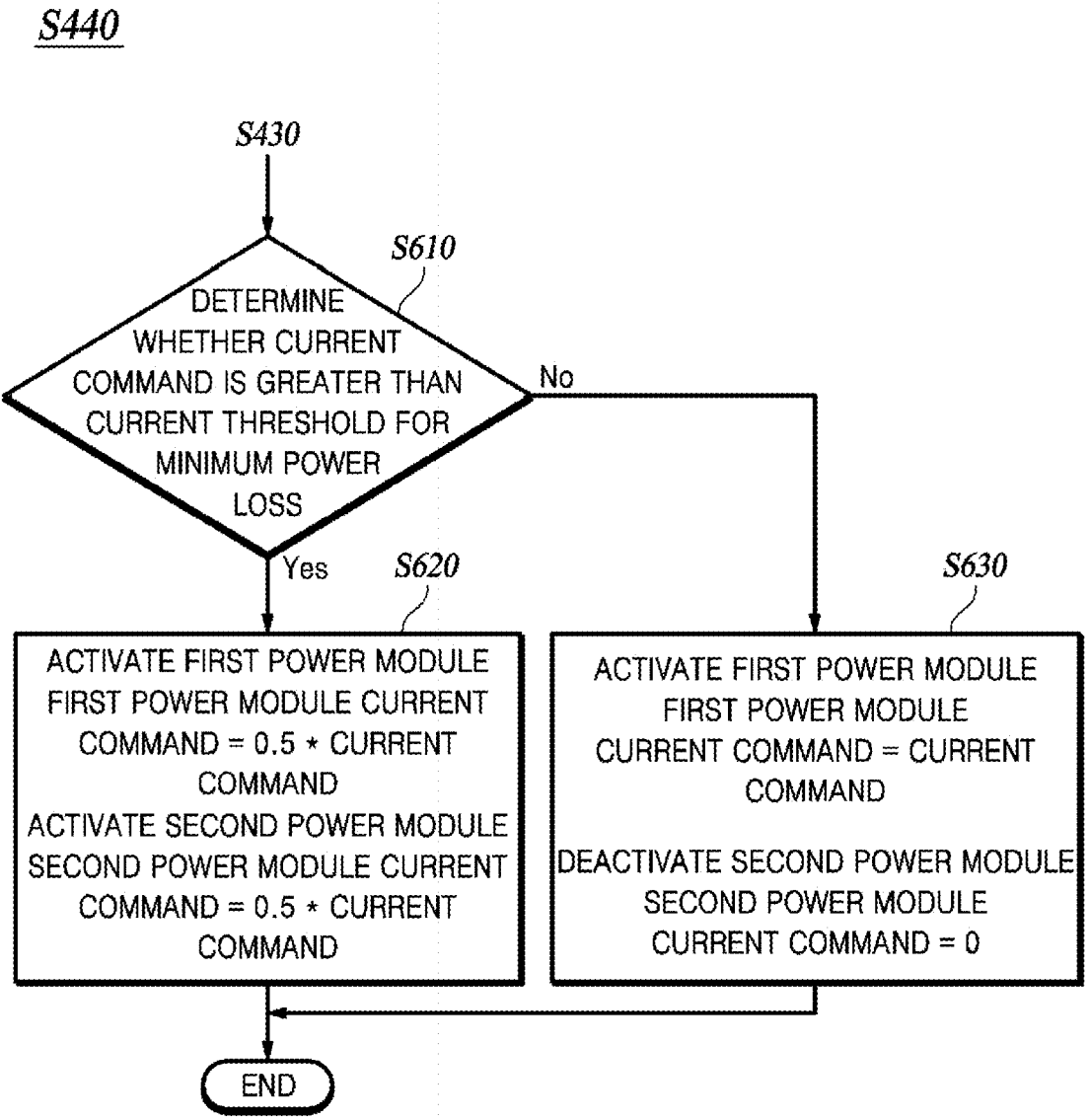
FIG. 6 is a flowchart illustrating in detail a process in which a control apparatus for minimizing a power loss in a redundancy electric brake system performs a mode for control of power loss minimization according to an embodiment of the present disclosure.

FIG. 6 is a flowchart illustrating in detail a process in which a control apparatus for minimizing a power loss in a redundancy electric brake system performs a mode for control of power loss minimization according to an embodiment of the present disclosure.

Referring to FIG. 6, a control unit 115 may determine whether a current command is greater than current threshold of minimum power losses in operation S610.

When it is determined that the current command is greater than the current threshold of minimum power loss in operation S610, the control unit 115 may activate both of a first power module 130 and a second power module 140 and allocate two halves of a magnitude of the current command to a first power module current command and a second power module current command, respectively, in operation S620. For example, in a case where conduction is made between drain and source terminals of a MOSFET, there is no voltage difference between the drain and source terminals of the MOSFET, so only conduction losses occurs.

When it is determined that the current command is less than or equal to the current threshold of minimum power loss in operation S610, the control unit 115 may deactivate the second power module 140 and activate only the first power module 130 to allocate all of the magnitude of the current command to the first power module current command in operation S630. Here, the deactivation of the second power module 140 may mean that the control unit does not perform a second MOSFET switching operation by allocating a value of 0 to the second power module current command. For example, the control unit 115 may operate only one of the first power module 130 and the second power module 140 in order to reduce MOSFET switching losses 320 occurring during the first and second MOSFET switching operations.

Figure 7:
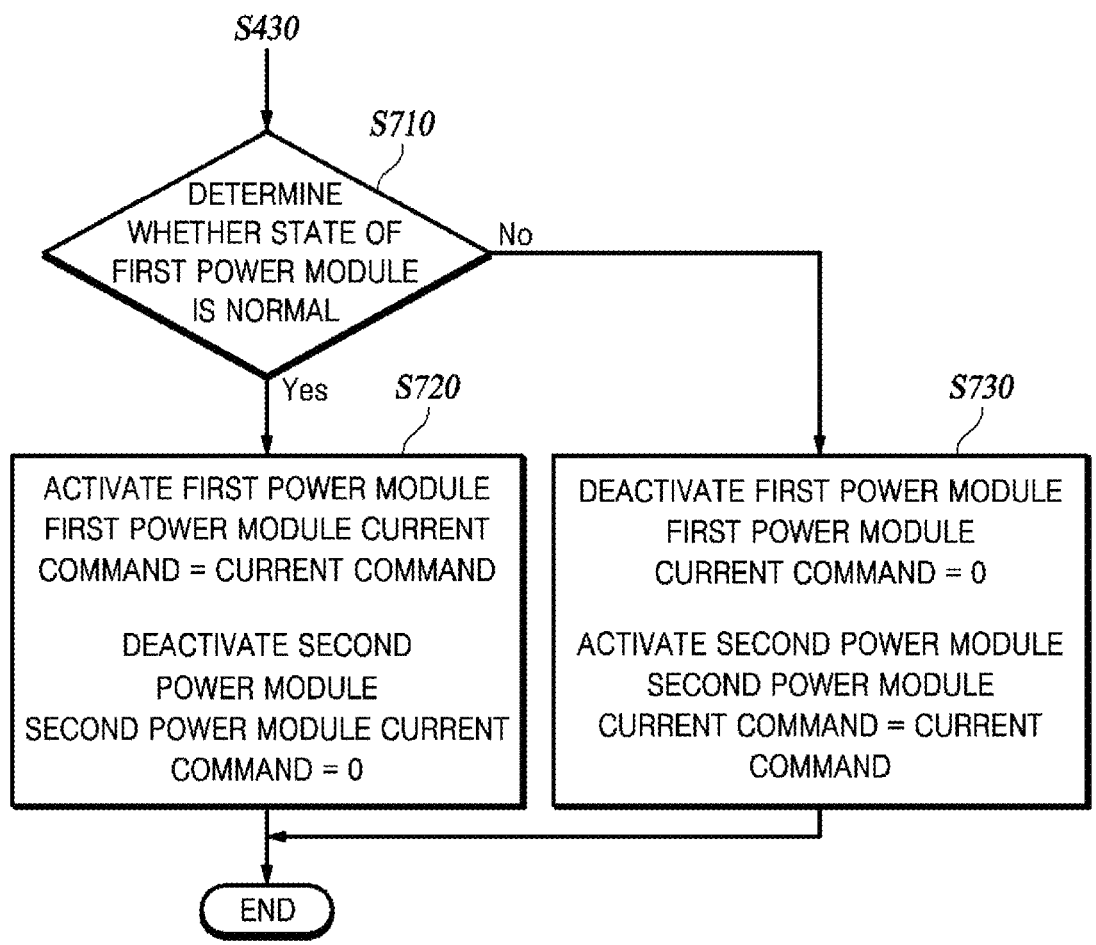
FIG. 7 is a flowchart illustrating in detail a process in which a control apparatus for minimizing a power loss in a redundancy electric brake system performs a mode for control of power module failure according to an embodiment of the present disclosure.

FIG. 7 is a flowchart illustrating in detail a process in which a control apparatus for minimizing a power loss in a redundancy electric brake system performs a mode for control of power module failure according to an embodiment of the present disclosure.

Referring to FIG. 7, a control unit 115 may determine whether the state of the first power module is normal in operation S710.

When it is determined that the state of the first power module is normal in operation S710, the control unit 115 may deactivate a second power module 140 and activate only a first power module 130 to allocate the whole magnitude of the current command to the first power module current command in operation S720. For example, in a case where there is a failure in the second power module 140, it may be controlled in such a way that allows a current to flow only in a first winding by the first power module 130.

When it is determined that the state of the first power module is not normal in operation S710, the control unit 115 may deactivate the first power module 130 and activate only the second power module 140 to allocate the whole magnitude of the current command to the second power module current command in operation S730. For example, in a case where there is a failure in the first power module 130, it may be controlled in such a way that allows a current to flow only in a second winding by the second power module 140.

According to one embodiment, in a method for minimizing a power loss in a redundancy electric brake system, it is possible to improve fuel efficiency of a vehicle by reducing an unnecessary power loss occurring in two power modules.

Various embodiments of the systems and techniques described herein may be implemented by a digital electronic circuit, an integrated circuit, a field programmable gate array (FPGA), an application specific integrated circuit (ASIC), a computer hardware, a firmware, software, and/or a combination thereof. These various embodiments may be implemented by one or more computer programs executable on a programmable system. The programmable system may include at least one programmable processor (which may be a special-purpose processor or general-purpose processor) coupled to receive and transmit data and instructions from and to a storage system, at least one input device, and at least one output device. Computer programs (also known as programs, software, software applications, or codes) contain instructions for a programmable processor and are stored in a "computer-readable medium".

The computer-readable recording medium may include all types of recording devices in which data readable by a computer system is stored. The computer-readable recording medium may be a non-volatile or non-transitory medium, such as a read-only memory (ROM), a compact disc ROM (CD-ROM), a magnetic tape, a floppy disk, a memory card, a hard disk, a magneto-optical disk, storage device, etc., and may further include a transitory medium such as a data transmission medium. In addition, the computer readable recording medium may be provided in a distributed processing system where computer systems are networked to store and execute the computer readable codes at distributed locations.

Although it is described that operations are sequentially performed in a flowchart/timing diagram of the present specification, this is merely illustrative of the technical idea of an embodiment of the present disclosure. In other words, one of ordinary skill would understand that steps described in flow charts/timing diagrams can be performed in a modified sequence or two or more of the steps can be performed in parallel without departing from the essential characteristics of the present disclosure. Therefore, the flow charts/timing diagrams are not limited to the time sequential manner.

Although exemplary embodiments of the present disclosure have been described for illustrative purposes, those of ordinary skill in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof

What is claimed is:

1. An apparatus for control of power loss minimization in a redundancy electric brake system that is provided with a motor to be supplied with power through two independent windings, the apparatus comprising:
    a first power module configured to receive power from a battery and supply a three-phase alternating current to a first winding of the motor;
    a second power module configured to receive power from the battery and supply a three-phase alternating current to a second winding of the motor;
    an input unit configured to receive data from an input information detector, wherein the data comprises first power module diagnostic information, second power module diagnostic information, metal-oxide-semiconductor field-effect transistor (MOSFET) specifications, diode specifications, and a current command for generating a required braking force;
    a calculation unit configured to calculate a current threshold of minimum power losses using the data;
    a determination unit configured to determine a state of the first power module and a state of the second power module using the first power module diagnostic information and the second power module diagnostic information; and
    a control unit configured to, upon determining that both of the state of the first power module and the state of the second power module are normal, perform a mode for control of power loss minimization based on the current command and the current threshold of minimum power losses.

2. The apparatus of claim 1, wherein the control unit is further configured to allocate two halves of a magnitude of the current command to a first power module current command and a second power module current command, respectively, to perform a current control.

3. The apparatus of claim 2, wherein the current command is greater than the current threshold of minimum power loss.

4. The apparatus of claim 2, wherein the control unit allocates a whole magnitude of the current command to the first power module current command to perform a current control.

5. The apparatus of claim 4, wherein the current command is less than or equal to the current threshold of minimum power loss.

6. The apparatus of claim 1, wherein the control unit is further configured to, upon determining that any one of the state of the first power module and the state of the second power module has failed, perform a mode for control of power module failure.

7. The apparatus of claim 6, wherein the control unit allocates a whole magnitude of the current command to a remaining one of the first power module and the second power module of which the state is normal.

8. A method for power loss minimization in a redundancy electric brake system including two independent power modules, which are a first power module and a second module, that receive power from a battery and supply current to a motor through two independent windings, respectively, the method comprising:
    receiving data including all or partial among a current command, first power module diagnostic information of the first power module, and second power module diagnostic information of the second power module;
    calculating a current threshold of minimum power losses using the data;
    determining a state of a first power module and a state of a second power module using the first power module diagnostic information and the second power module diagnostic information; and
    performing a mode for control of power loss minimization based on the current command and the current threshold of minimum power loss upon determining that both of the state of the first power module and the state of the second power module are normal.

9. The method of claim 8, wherein the calculating of the current threshold of minimum power loss using the data comprises:

calculating conduction losses using a root mean square (RMS) value of a metal-oxide-semiconductor field-effect transistor (MOSFET) conduction current; and calculating switching losses using a MOSFET switching frequency.

10. The method of claim 9, wherein the conduction losses are calculated by additionally using a MOSFET drain source on-state resistance and a MOSFET diode on-state resistance.

11. The method of claim 9, wherein the switching losses are calculated by additionally using MOSFET switch energy losses and diode energy losses.

12. The method of claim 11, wherein the diode energy losses are energy losses occurring in a diode during a MOSFET switching operation.

13. The method of claim 9, further comprising:
calculating a current threshold at which the switching losses start to become greater than the conduction losses.

14. The method of claim 8, wherein the performing of the mode for control of power loss minimization based on the current command and the current threshold of minimum power loss comprises:
allocating two halves of a magnitude of the current command to a first power module current command and a second power module current command, respectively, to perform a current control.

15. The method of claim 14, wherein, in the allocating of two halves of a magnitude of the current command to the first power module current command and the second power module current command, respectively, to perform a current control, the current command is greater than the current threshold of minimum power loss.

16. The method of claim 14, further comprising:
allocating a whole magnitude of the current command to the first power module current command to perform a current control.

17. The method of claim 16, wherein in the allocating of the whole magnitude of the current command to the first power module current command to perform a current control, the current command is less than or equal to the current threshold of minimum power loss.

18. The method of claim 8, further comprising:
performing a mode for control of power module failure upon determining that any one of the state of the first power module and the state of the second power module has failed.

19. The method of claim 18, wherein in the performing of the mode for control of power module failure, a whole magnitude of the current command is allocated to a remaining one of the first power module and the second power module of which the state is normal.

* * * * *